Nov. 14, 1939.  W. G. FLETCHER  2,180,143
SCOOTER
Filed Sept. 15, 1938
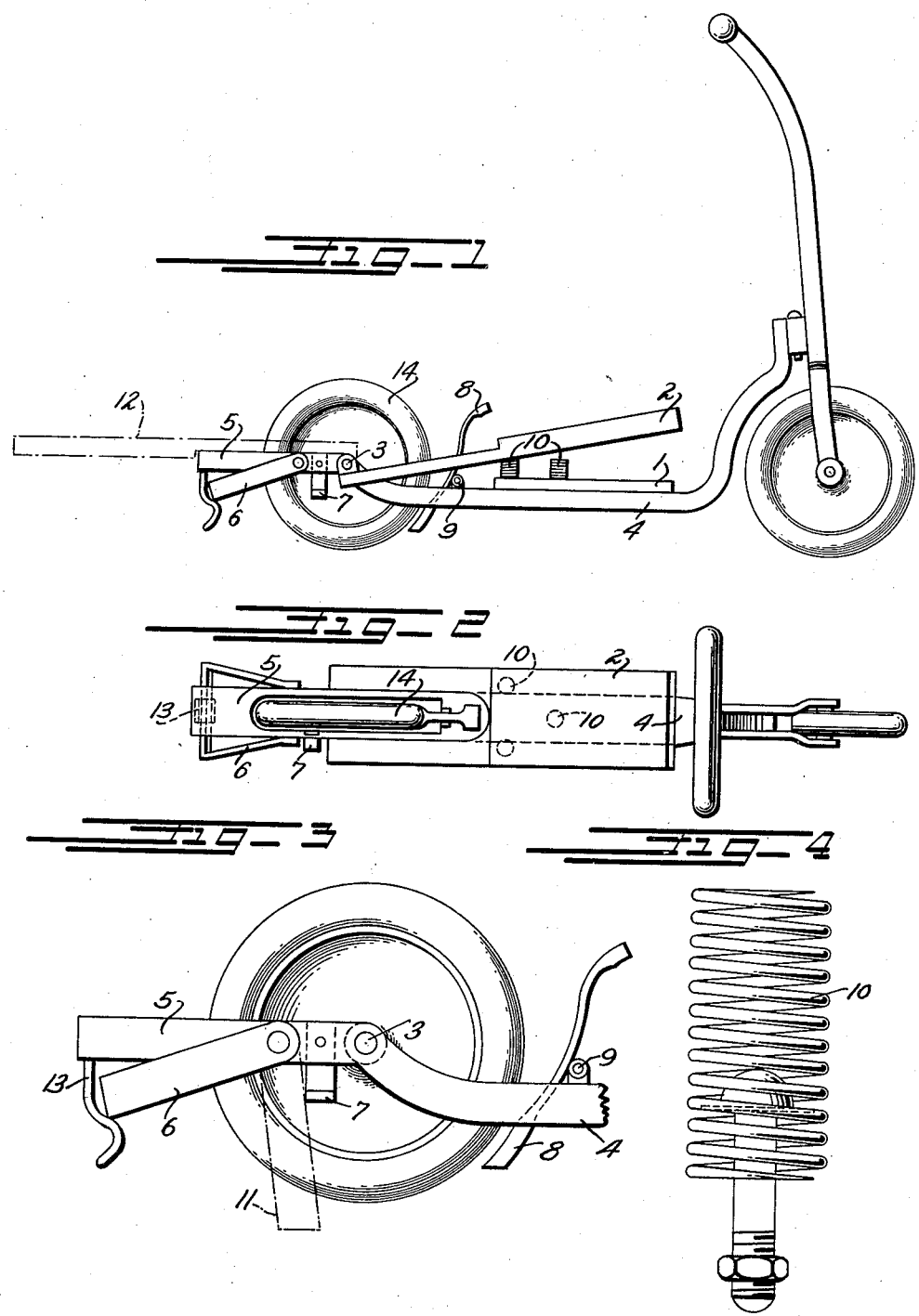
INVENTOR
William G. Fletcher
BY J. Irving Terhune
ATTORNEY Patented Nov. 14, 1939

2,180,143

UNITED STATES PATENT OFFICE 2,180,143

SCOOTER

William G. Fletcher, Bogota, N. J.

Application September 15, 1938, Serial No. 230,004

1 Claim. (Cl. 280—87.04)

This invention relates to improvements in scooters as used by children in play, and has for its objects the springing up and down of the rider or as a shock absorber when striking a bump, or it can be used as a package carrier.

I attain these results by means of a device as shown in the accompanying drawing in which:

Fig. 1 is a side view of a scooter with the improvements attached.

Fig. 2 is a plan view of the same.

Fig. 3 is a detail of the back end of the device.

Fig. 4 shows the spring, one of the several.

In the drawing similar numerals refer to similar parts throughout the several views.

On the platform 1 of an ordinary scooter there are several springs 10.

On the extended axle 3 of the rear wheel there is pivoted an auxiliary platform 2 which rests on the springs 10 on the platform 1.

The platform 2, which has one end pivoted on the axle 3 can be thrown over the wheel 13 to a position indicated by the dotted lines 12 and resting on the extension 5 of the frame 4.

To keep the scooter in an upright position when not in use, a bracket 6 can be dropped down to a stop piece 7 as shown in position 11. To hold the bracket 6 out of the way when not in use, a spring catch 13 secured to the extended frame 5 is used.

There is a brake 8 pivoted at 9 arranged to contact the back wheel 14 by the foot of the rider when desired.

The operator or rider stands on the platform 2 generally with one foot and propels with the other foot, the springs 10 give the platform and the rider a bouncing or a more exciting experience than that felt riding on an ordinary scooter.

Or if desired in riding on rough surface it will act as a stabilizer.

If it is desired to carry any article or package the platform 2 is thrown back to the position 12 and articles are placed on it.

Having thus described my invention what I claim and desire to secure by patent is:

In a scooter having a rear axle and a platform to receive a standing occupant, springs secured to said platform, a luggage carrier pivoted to said rear axle and so constructed and arranged that said carrier can be projected over said platform and engage said springs and thereby form a second, spring supported, platform for the occupant.

WILLIAM G. FLETCHER.